Sept. 4, 1928.

C. E. EHNBORN 1,683,027

WINDOW SEAT

Filed Aug. 23, 1926    2 Sheets-Sheet 1

Witnesses:
E. W. Petzing
B. G. Richards

Inventor:
Clemens E. Ehnborn
By Joshua R. H. Potts
His Attorney.

Sept. 4, 1928.

C. E. EHNBORN

WINDOW SEAT

Filed Aug. 23, 1926

1,683,027

2 Sheets-Sheet 2

Witnesses:
E. H. Petzing.
B. G. Richards

Inventor:
Clemens E. Ehnborn.
By Joshua R. H. Potts
His Attorney

Patented Sept. 4, 1928.

1,683,027

UNITED STATES PATENT OFFICE.

CLEMENS E. EHNBORN, OF CHICAGO, ILLINOIS.

WINDOW SEAT.

Application filed August 23, 1926. Serial No. 130,824.

My invention relates to improvements in window seats and has for its object the provision of an improved construction of this character which may be readily applied to any window sill and securely locked thereto.

Other objects will appear hereinafter.

The invention consists in the combinations and arrangements of parts hereinafter described and claimed.

Figure 1:
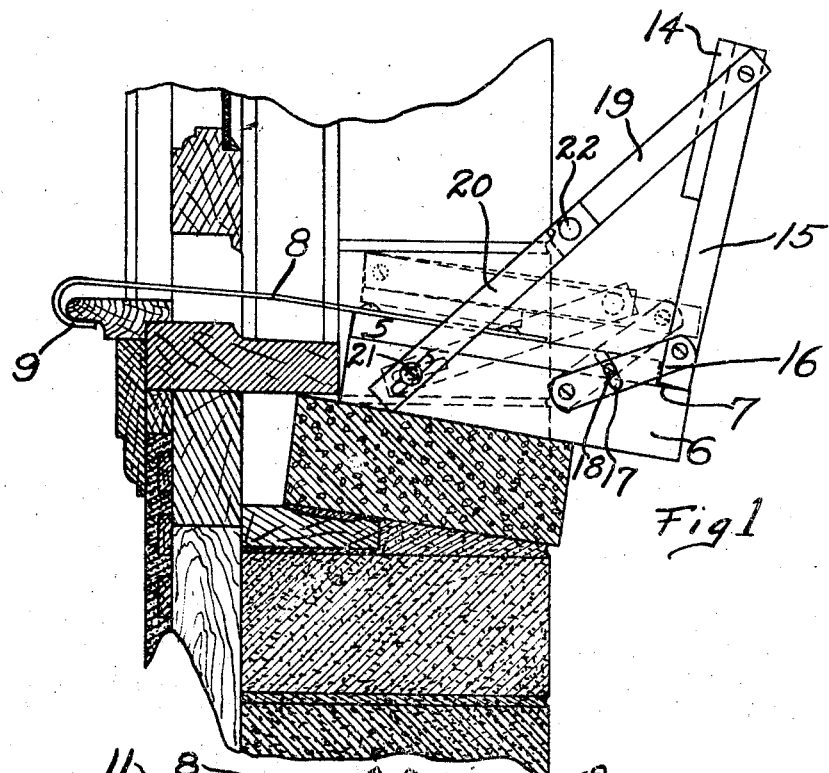
Figure 2:
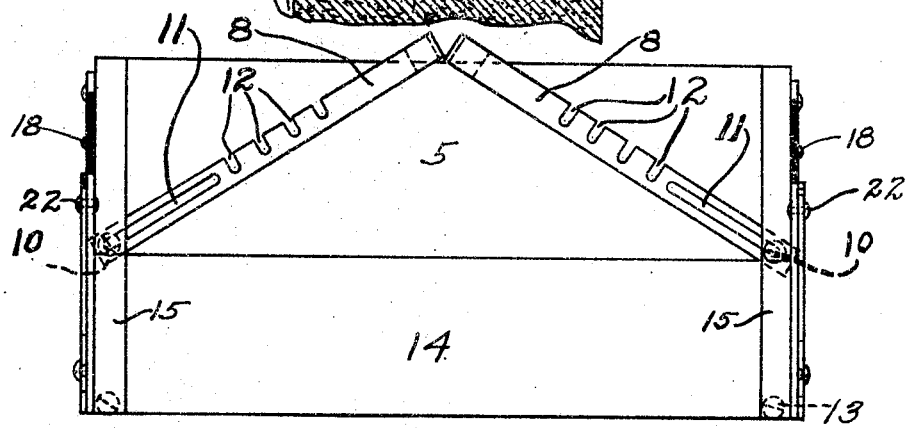
Figure 3:
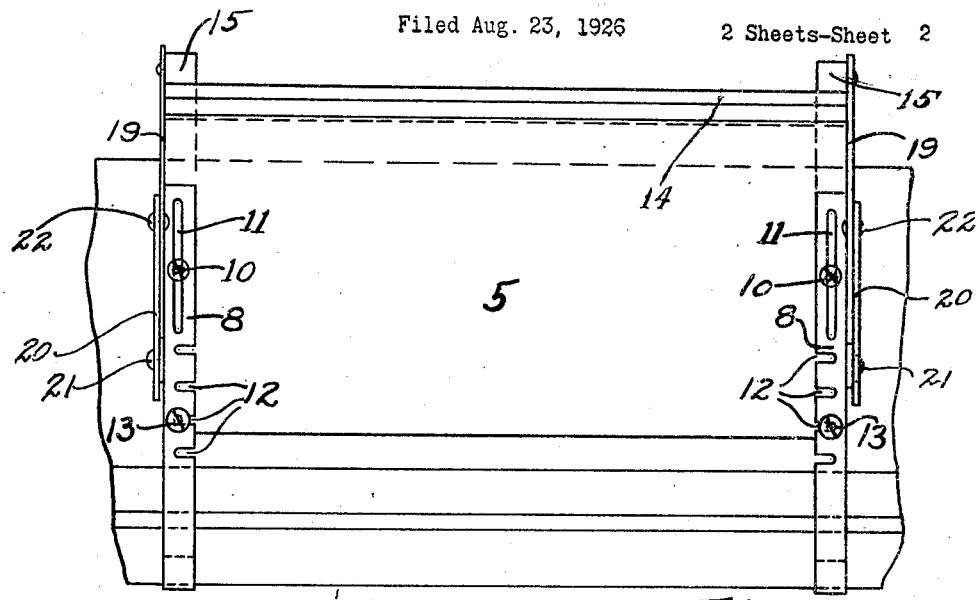
Figure 4:
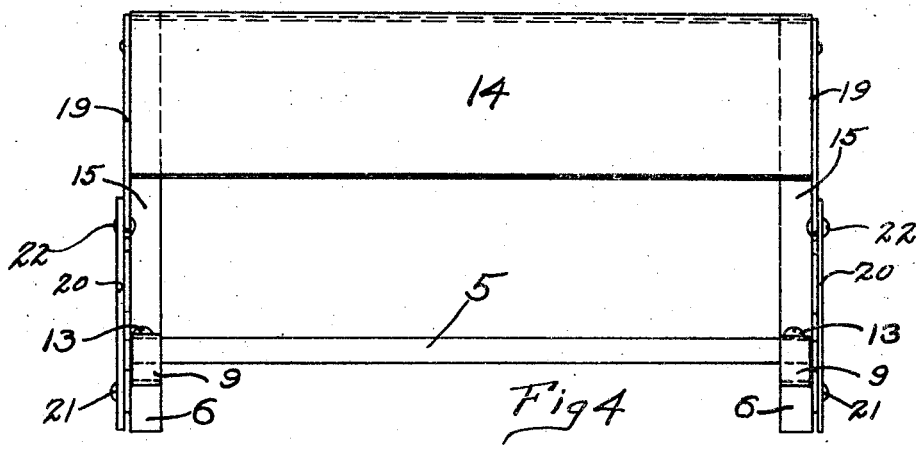

The invention will be best understood by reference to the accompanying drawings forming a part of this specification, and in which, Fig. 1 is a sectional view through a window sill showing a seat embodying the invention in position of use;

Fig. 2 a top plan view of the seat removed and folded flat for transportation;

Fig. 3 a top plan view of the seat member extended and attached to the window sill; and Fig. 4 an inner face view of the seat detached.

The preferred form of construction as illustrated in the drawings comprises a seat board 5 of convenient size and length provided with side rails 6 secured to the under side thereof flush with the ends and projecting at one edge to form notches 7 as shown in Fig. 1. The seat board 5 is provided with two clamping bars 8 having hooks 9 at their projecting ends adapted and arranged to engage the inner ledge of a window sill as shown in Fig. 1. At their other ends the clamping bars 8 are pivotally and slidably secured to the seat board 5 by means of headed studs or screws 10 engaging through elongated slots 11 and whereby said clamping bars may have both sliding and pivotal movement relatively to the seat board. Each clamping bar is provided at its inner edge with a plurality of lateral notches 12 adapted and arranged to engage headed studs 13 on the seat board to lock the clamping bars in adjusted positions. By this arrangement it will be noted that the seat board may be rested on the outer portion of a window sill and the clamping hooks 9 engaged with the inner ledge of the window sill, said clamping bars being readily adjustable to fit different sizes or widths of window sills.

A back rest 14 is also provided for the seat, said back rest carrying side arms 15 normally resting when in use in the notches 7 as shown. The lower ends of the side bars 15 are pivotally connected by links 16 with the corresponding side rails 6, and each link 16 is also connected by means of the slot 17 and screw 18 with the corresponding end of the seat member. The upper portion of each side bar 15 is pivotally connected with a brace link 19 cooperating with a corresponding brace link 20, which in turn is given a slot and pin connection 21 with the corresponding side rail 6, said links 19 and 20 being pivotally connected together at 22 to constitute a knee joint. The arrangement of the links is such that the back member may be readily extended into the position shown in the full lines in Fig. 1, or folded flat for convenience in transportation as shown by the dotted lines in Fig. 1. It will also be observed that when the back member is in extended position the links 20 contact with the outer edges of the clamping bars 8 and thus prevent disengagement of said clamping bars from the studs 13, so that when said window seat is occupied it is impossible for the same to become detached from the window sill. When the back member 14 is partially folded, the clamping bars will be released, thus permitting folding into the position illustrated in Fig. 2 for convenience in transportation. In this way it will be noted that the window seat and clamping bars may be readily folded when desired into compact form for transportation. The specific form and arrangement of parts is a simple and effective one for the purpose.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A construction of the class described comprising a seat member; a back member foldable on said seat member; a clamping member adjustably mounted on said seat and arranged to clamp the same to different sizes of window sills; and swinging brace links for supporting the back in open position and adapted to extend into the path of said clamping member when the back is extended to lock said clamping member against adjustment but release the same when said back is folded, substantially as described.

2. A construction of the class described comprising a seat member; a back member foldable on said seat member; two clamping bars slidably and pivotally mounted on said seat member arranged to engage different sizes of window sills, there being notches in the sides of said clamping bars and studs on said member engaging said notches; and members connected to said back member and arranged to lie in the path of the clamping bars to lock said clamping bars in engagement with said studs when said back is extended but release the same when said back is folded, substantially as described.

3. A construction of the class described comprising a seat member; a back member foldable on said seat member; two clamping bars slidably and pivotally mounted on said seat member arranged to engage different sizes of window sills, there being notches in the sides of said clamping bars and studs on said member engaging said notches; and swinging links foldably connecting said back member with said seat member, said links being arranged to extend in the path of said clamping bars when said back is extended to lock said clamping bars from disengagement with said studs, substantially as described.

4. A construction of the class described comprising a seat member; a pair of clamping bars mounted on said seat member, each of said clamping bars being provided at one end with a downwardly turned hook and the other end being given a slot and pin connection with the seat member, each of said clamping bars being provided on its inner edge with a plurality of notches; headed studs on said seat member arranged to engage said notches; a foldable back for said seat member and means associated with said back to lock said clamping bars against disengagement from said studs when the back is in extended position and release said clamping bars when folded, substantially as described, 5. A construction of the class described comprising a seat member; a pair of clamping bars mounted on said seat member, each of said clamping bars being provided at one end with a downwardly turned hook and the other end being given a slot and pin connection with the seat member, each of said clamping bars being provided on its inner edge with a plurality of notches; headed studs on said seat member arranged to engage said notches; a back member provided with side arms; and foldable links connected with said side arms and with said seat member, said foldable links being arranged to extend into the path of the clamp bars when the back member is extended to prevent disengagement of said clamping bars from said studs, and to permit such disengagement when said back member is folded, substantially as described.

6. A window seat comprising a seat member; side rails for said seat member secured to the under side thereof and extending beyond one edge of the seat member to form notches; clamping bars secured to said seat member adjacent the ends thereof, each clamping bar being provided at one end with a hook and at its other end with a slot and pin connection with the seat member, each clamping bar being provided along its inner edge with a plurality of lateral notches; studs on said seat member to engage said notches; a folding back member provided with side arms arranged to rest in the notches provided by the extension of the seat side rails; and foldable links connecting said side arms with the ends of said seat and arranged to extend into the path of the clamp bars when the back is extended to lock said clamping bars against disengagement from said studs at such times and to permit such disengagement when said back member is folded, substantially as described.

In testimony whereof I have signed my name to this specification.

CLEMENS E. EHNBORN.